Feb. 10, 1970     G. MESCHONAT ET AL     3,494,592
BOLT TENSIONING APPARATUS
Filed Dec. 4, 1967     2 Sheets-Sheet 1
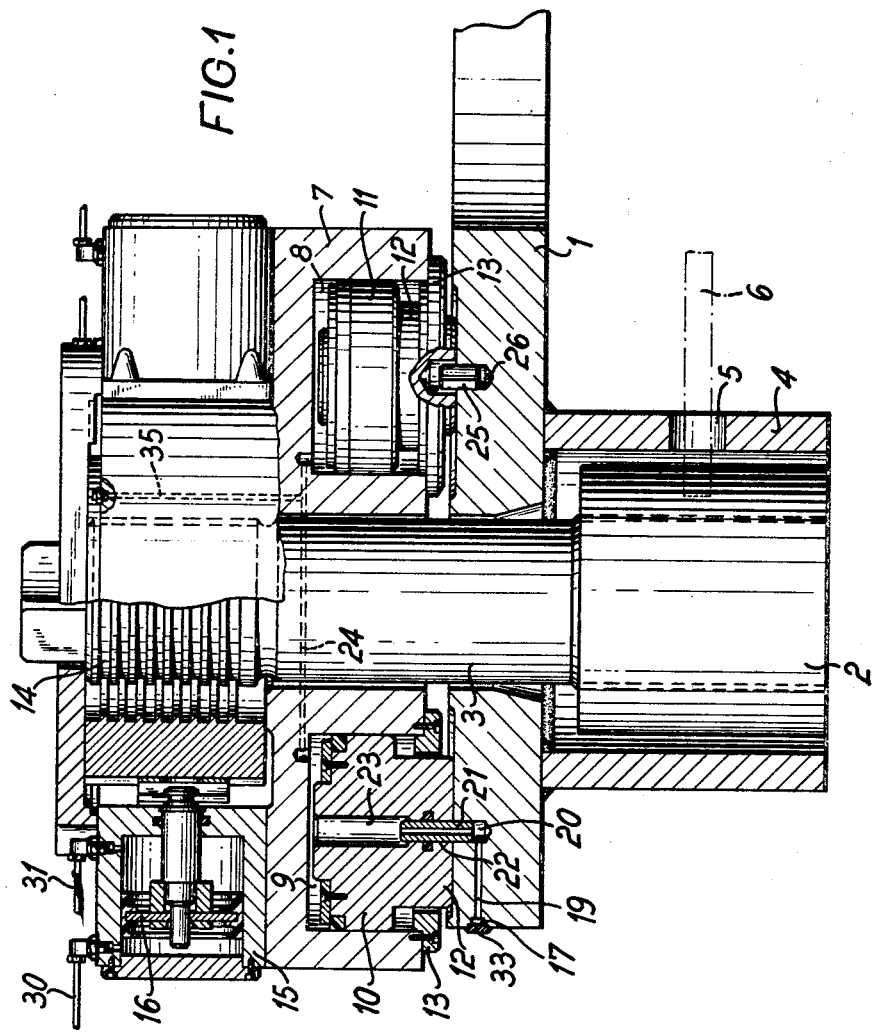

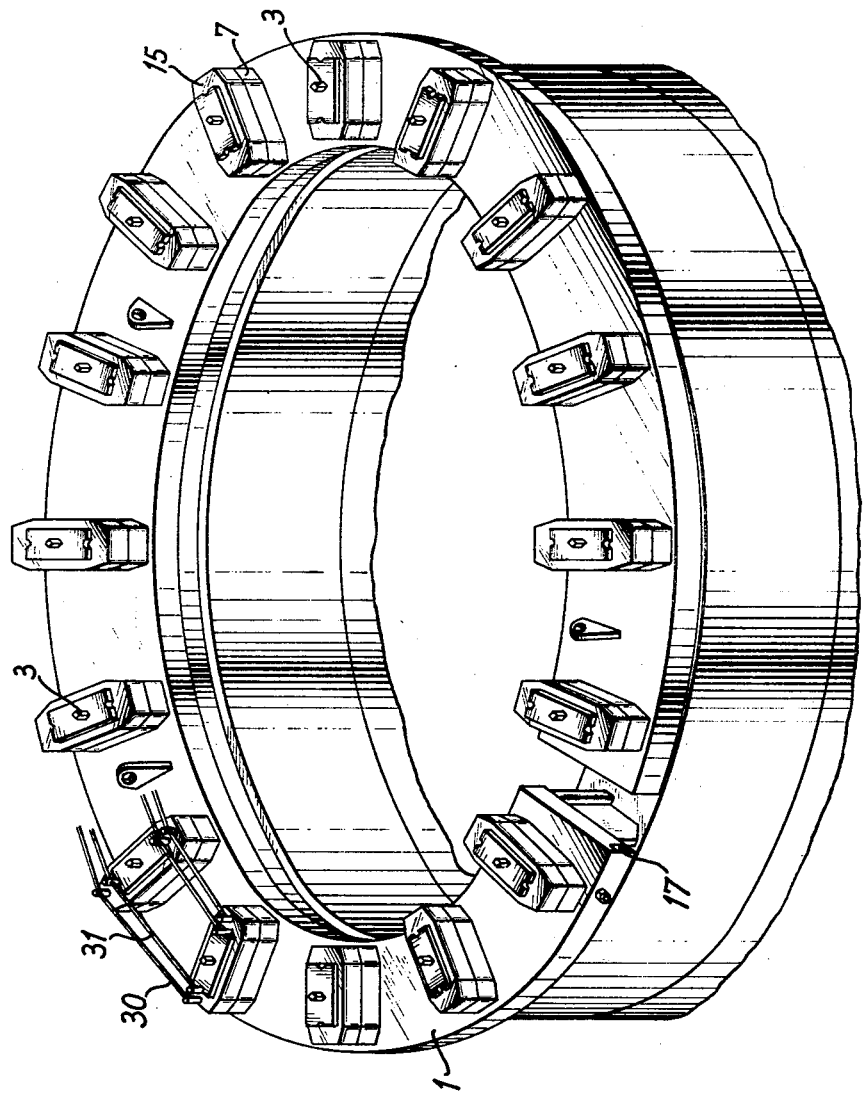

United States Patent Office 3,494,592
Patented Feb. 10, 1970

3,494,592
BOLT TENSIONING APPARATUS
Gunter Meschonat, Holsteiner Str. 10, Dortmund, and Eberhard Schumann, Uferweg 4, Waltrop, both of Germany
Filed Dec. 4, 1967, Ser. No. 687,826
Claims priority, application Germany, Dec. 8, 1966, K 60,883
Int. Cl. B25b 21/02
U.S. Cl. 254—29                                4 Claims

ABSTRACT OF THE DISCLOSURE

The specification describes an apparatus for tightening bolts in a circular formation. The apparatus, which is generally in the form of a ring, comprises pneumatic double-acting pistons for forcing grooved jaws radially onto a grooved end of the bolt. This is followed by the application of hydraulic pressure to pistons which act in an axial direction and place the bolt under tension so that its position can be fixed by means of a normal nut. In order to avoid leakages the ducts for supplying the hydraulic pistons are in the form of passages in a ring-shaped part of the apparatus.

---

The present invention relates to fluid operated apparatus for straining or tensioning bolts before their nuts are tightened.

In accordance with a previous proposal which to the knowledge of the applicants has as yet not been published, such an apparatus designed for tensioning bolts arranged in a circular formation was to comprise a ring with holes for the passage of the bolts to be tensioned, bodies which are carried on the ring and are arranged to surround the bolts, fluid pressure operated means in each body with grooved jaws for gripping grooved spigots on the ends of the bolts, and hydraulic pistons for moving the bodies in relation to the ring in a direction parallel to the axes of the bolts for tensioning them.

An advantage of such apparatus is that the tensioning of the bolts is not carried out by means of twisting the nuts on them so that there is no subjection to torsion. The apparatus described in the last preceding paragraph can be quickly applied to the circular formation of bolts and removed from them after use so that it is particularly suitable for use where there is a radiation hazard.

However, such apparatus has the disadvantage that it is used with flexible pipes for applying the pressure liquid to the pistons and consequently leakages occur owing to the extremely high pressures used. Despite the fact that owing to the reliability of modern forms of flexible pressure pipes leakages are not unduly frequent, owing to the fact that the apparatus is largely remotely controlled, they are extremely troublesome in the particular circumstances involved.

One object of the present invention is to avoid these disadvantages.

A more specific object of the invention is to provide such an apparatus in which the use of hoses for pressure liquid is excluded.

Accordingly, the present invention consists in an apparatus for tensioning bolts in a circular formation, comprising a ring with holes for the passage of the bolts to be tensioned, bodies which are carried on the ring and arranged to surround the bolts, fluid pressure operated means in each body with grooved jaws for gripping grooved spigots on the ends of the bolts, and hydraulic pistons for moving the bodies in relation to the ring in a direction parallel to the axes of the bolts for tensioning the latter, characterized in that the apparatus further comprises hollow piston rods for conducting driving liquid under pressure into piston spaces in the bodies, the hollow piston rods being connected hydraulically by passages in the ring with an annular common oil supply and return duct running around the ring, the annular duct being formed by a closed groove in the ring; and, as the fluid pressure operated means, double-acting pneumatic pistons.

While it is true that it is necessary to use a flexible pipe for the supply of the pressure liquid to the annular duct, the connections between the annular duct and the pistons are by passages in the ring so that there is no very substantial amount in the length of flexible pipe required. It has been found, surprisingly, that comparatively small forces are required for applying the jaws to the spigots of the bolts so that a pneumatic system can be used in which small leaks are relatively unimportant. Conventional air pressures can be used for operation.

In accordance with a preferred embodiment of the invention the apparatus further comprises ducts fixed in the ring and leading into passages in the piston rods, the ducts being alined with the direction of movement of the pistons and making a liquid-tight connection with the passages in the piston rods. These ducts, which are in the form of short tubes, have the advantage of locating the pistons, and thereby the bodies, correctly in relation to the bolts.

Preferably, also, for each bolt to be tensioned there are at least two such hydraulic pistons, one of which is connected by a radial passage section with the annular duct, there being a further passage section in the ring connecting the two pistons together hydraulically for ganged exertion of a tensioning force on the respective bolt.

The closed groove forming the annular duct can be closed by means of a metal hoop welded in position. This is an advantageous feature as regards the manufacture of the apparatus since it is a comparatively simple matter to produce the groove by turning.

The invention is now further described with reference to a single embodiment of it shown in the accompanying drawings.

FIG. 1 is a radial section through the embodiment of the invention.

FIG. 2 is a general view of the embodiment of the invention.

As shown in the figures and more particularly in FIG. 2 the apparatus in accordance with the invention comprises a ring 1 which has openings in it and is fitted over bolts 3 arranged in a circular formation. Below the ring 1 there are cylindrical tubular parts 4 which surround conventional nuts 2 of the bolts 3 to be tensioned. These parts 4 are provided with recesses 5 for the insertion of a tool 6, shown in broken lines in FIG. 1, for turning the nuts 2. The ring 1 is provided with a number of bodies generally denoted by reference numeral 7, one such body being provided for each bolt 3 to be tensioned. Each of these bodies 2 comprises a number of tensioning cylinders such as 8 and 9 in which hydraulic pistons 10 and 11 are fitted for sliding movement brought about by the introduction of liquid under pressure into the spaces between the top ends of the pistons and the tops of the cylinders for the purpose of tensioning the bolts. The pistons have piston rods 12 of squat appearance which pass through end plates 13 and abut, as can be seen from the drawing, against the top surface of the ring 1.

As can be seen from FIG. 1 the top part of each bolt 3 is provided with circular or helical grooves 14 with which the bolt can be gripped. This gripping is carried out by means of grooved jaws which are moved inward radially towards the axis of the bolt by means of double-acting pistons 16 mounted in cylinders 15 for pneumatic operation by means of compressed air.

The tensioning cylinders 8 and 9 are operated hydraulically by means of liquid under pressure flowing through passageways in the ring 1. These ways include an annular groove 17 in the periphery of the ring 1. The groove 17 is closed by means of a hoop or ring 33 which is welded in place.

For each body 7 there is a radially extending passage or passage section 19 running from the closed groove 17 to a hole 20 drilled in the ring 1 in a direction parallel to the axis of the bolt. In the hole 20 there is placed a hollow sealing cylinder or duct 21 which runs into the hole 22 in the hollow piston rod 12, a seal being provided around the duct 21. The upper part of the passage in the piston rod 12 is widened out at 23. At the top of the cylinder in which the piston 10 is placed there is a hole leading into a horizontal passage 24 which runs to the further cylinder 8 for operation of the piston 11 on the other side of the bolt 3. The duct or passage 24 has an upwardly extending branch 35 leading to a valve for bleeding off air. In the construction shown for each piston 10 connected by a radial passage 19 with the passage 17 there is only one piston 11 though it would be possible to provide more than one of the latter type of piston. That is to say for each piston 10 connected by a radial passage 19 with the duct 17 there would be a branching duct 24 leading to a number of further cylinders 8 with pistons 11. The piston rod 12 of the piston 11 is guided by means of a pin 25 placed in a hole 26 drilled in the ring 1 in a direction parallel to the axis of the bolt 3.

For operating the double-acting pistons 16 we provide annular ducts 30 and 31 at the top of the apparatus.

The manner of operation of the apparatus is as follows. After the nut 2 has been run up hand-tight on each bolt 3 the apparatus in accordance with the invention is placed over the bolts and moved in an axial direction until the parts 4 abut against a flange ring or other component which the nuts 2 and bolts 3 are to hold in place. Liquid under pressure is then passed into the duct 17 and forces the body 7 upwards in relation to the ring 1. This pressurization can be carried out in two stages with an automatic switch-over from low pressure to high pressure. In each body 7 the pressure liquid flows through the connecting duct 24 so that both cylinders 8 and 9 are forced upwards evenly.

After the operator has applied precisely the required force for tensioning the bolts, the nuts 2 are tightened by means of the tool 6 and the hydraulic pressure is released. The pistons 16 are then radially retracted to free the top end of the bolt so that the apparatus can be removed.

The use as the annular duct 17 of a closed groove simplifies construction of the apparatus since the passages 19 can be drilled before the hoop 33 is welded in place.

An important advantage of the described tensioning apparatus is that it can be applied to a flange with a large number of bolts and can be rapidly operated. Besides the duct 30 and 31 no flexible pipes and screw connections are necessary so that leakages are largely avoided.

While we have described one embodiment of our invention in order that those in the art may take full advantage of it, it is to be understood that the scope of the invention is not to be limited to the details of construction shown and is to be determined by the following patent claims.

We claim:

1. In an apparatus for tensioning bolts in a circular formation comprising a ring with holes for the passage of the bolts to be tensioned, bodies which are carried on the ring and arranged to surround the bolts, fluid pressure operated means in each body with grooved jaws for gripping grooved spigots on the ends of the bolts, and hydraulic pistons for moving the bodies in relation to the ring in a direction parallel to the axes of the bolts for tensioning the latter, the invention which consists in that the apparatus further comprises hollow piston rods for conducting pressure liquid into pressure piston spaces in the bodies, the hollow piston rods being connected hydraulically by passages in the ring with an annular common liquid supply and return duct running around the ring, the annular duct being formed by a closed groove in the ring; and, as the fluid pressure operated means, double-acting pneumatic pistons.

2. The structure as set forth in claim 1, further comprising ducts fixed in the ring and leading into passages in the piston rods, the ducts being alined with the direction of movement of the pistons and making a fluid-tight connection with the passages in the piston rods.

3. The structure as set forth in claim 1, in which for each of the bolts to be tensioned there are at least two such hydraulic pistons, one of which is connected by a radial passage section with the annular passage, there being a further passage section in the ring connecting the two pistons together hydraulically for ganged exertion of a tensioning force on the respective bolt.

4. A structure as set forth in claim 1, comprising a hoop welded on the ring so as to close the groove.

References Cited

UNITED STATES PATENTS

| | | | |
|---|---|---|---|
| 3,144,708 | 8/1964 | Poorman | 29—200 |
| 3,287,999 | 11/1966 | Kreckel et al. | 81—54 |
| 3,362,682 | 1/1968 | Meschonat et al. | 254—29 |

THOMAS H. EAGER, Primary Examiner

U.S. Cl. X.R.

81—54; 29—200, 252